United States Patent

Daigle et al.

[11] 3,778,985
[45] Dec. 18, 1973

[54] AIR CLEANER WITH FOLDING SIDE WALLS

[75] Inventors: Paul A. Daigle, Castle Rock; Donald D. Gronholz, Bloomington, both of Minn.

[73] Assignee: Donaldson Company, Inc., Minneapolis, Minn.

[22] Filed: Feb. 9, 1972

[21] Appl. No.: 224,748

[52] U.S. Cl. .................. 55/497, 55/500, 55/502, 55/509, 55/511, 55/521
[51] Int. Cl. ............................................ B01d 27/08
[58] Field of Search ............... 55/497, 498, 499, 55/500, 502, 511, 491, 521, DIG. 31; 209/144

[56] References Cited
UNITED STATES PATENTS

| | | | |
|---|---|---|---|
| 2,709,489 | 5/1955 | Keebler | 55/DIG. 31 |
| 2,973,831 | 3/1961 | Sprouse et al. | 55/491 |
| 3,031,047 | 4/1962 | Williams | 55/DIG. 31 |
| 3,127,695 | 4/1964 | Driscoll et al. | 55/DIG. 31 |
| 3,142,550 | 7/1964 | Kuehne | 55/DIG. 31 |
| 3,695,012 | 10/1972 | Rolland | 55/521 X |
| 3,703,957 | 11/1972 | Swanson et al. | 209/144 |
| 3,712,033 | 1/1973 | Gronholz | 55/502 X |

*Primary Examiner*—Dennis E. Talbert, Jr.
*Assistant Examiner*—Neil F. Greenblum
*Attorney*—Ralph F. Merchant et al.

[57] ABSTRACT

A unitary filter housing molded from a plastic material is shown, including a bottom wall with an aperture, and a pair of opposing, two-piece side walls. A rectangularly-shaped pleated filter element extends between the side walls. The side walls each have an outer wall portion hinged to the bottom wall, and an inner wall portion hinged to the top edge of the outer wall portion. The inner wall portion extends downwardly between a pair of outer folds of the pleated filter so that at least one outer fold extends upwardly between the wall portions. Hinged end walls are provided to seal the ends of the filter element and to aid in holding the side walls in position.

5 Claims, 5 Drawing Figures

PATENTED DEC 18 1973 3,778,985
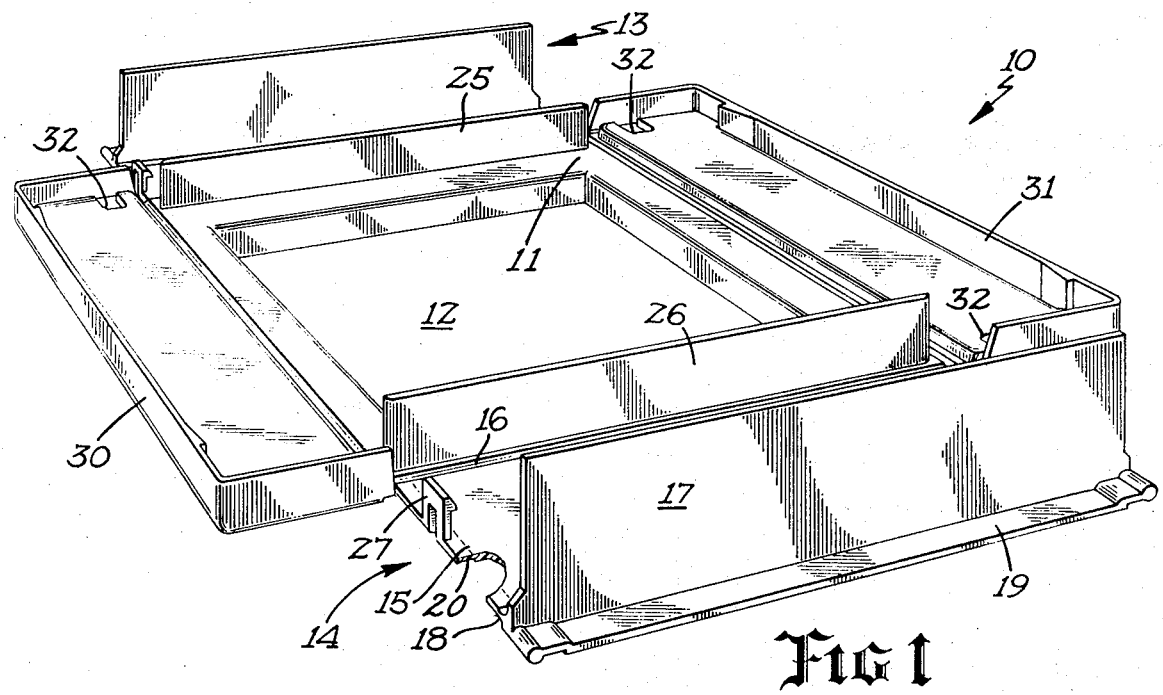
Fig 1
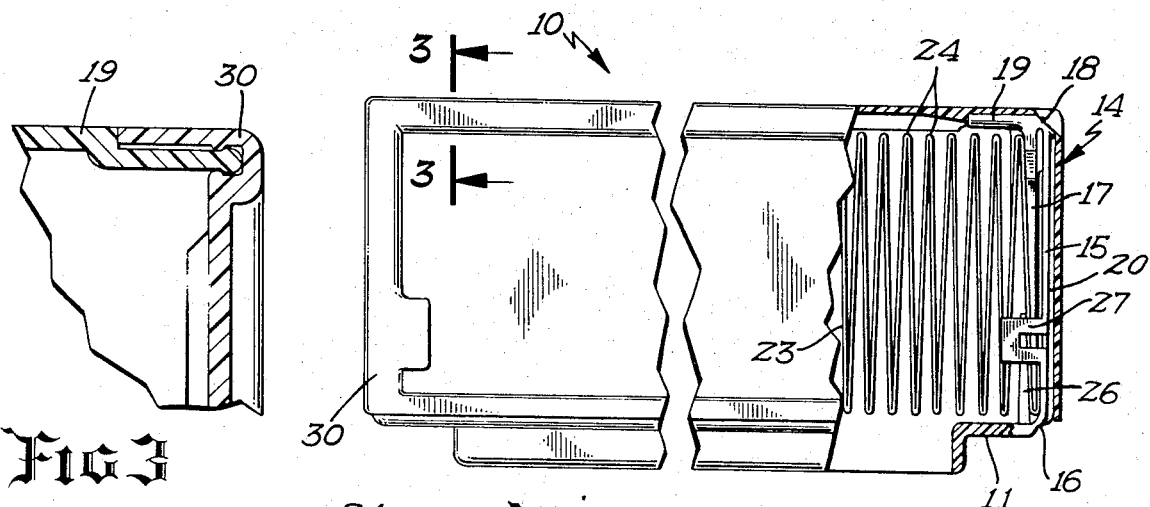
Fig 3
Fig 2
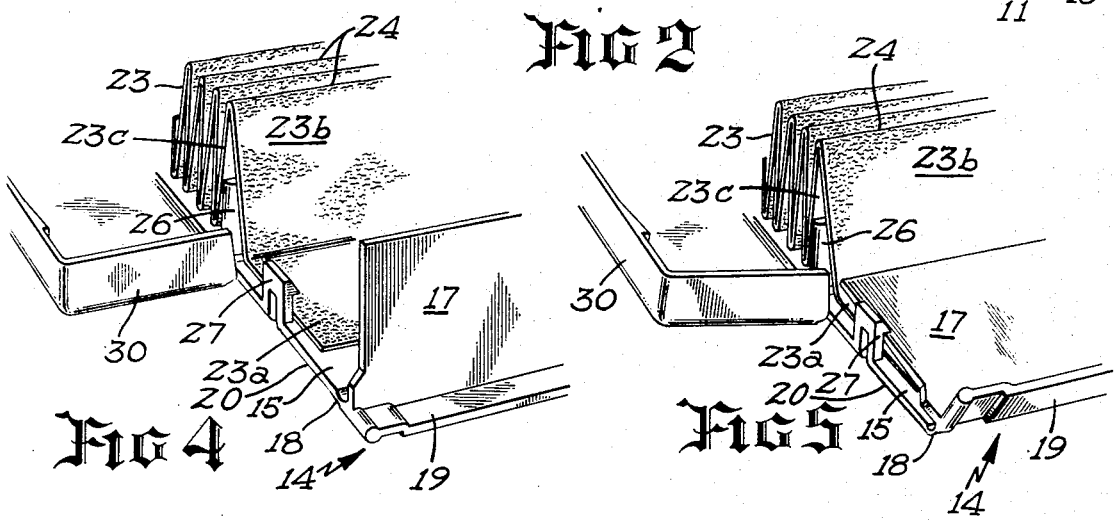
Fig 4
Fig 5

AIR CLEANER WITH FOLDING SIDE WALLS

BACKGROUND OF THE INVENTION

1. Field of the Invention

This invention relates generally to fluid filters and more particularly relates to a disposable air filter assembly having a molded plastic housing with folding side walls designed to securely hold the ends of a pleated filter element.

2. Description of the Prior Art

An earlier development in disposable air filters is shown in the Gronholz U.S. Pat. No. 3,712,033, issued Jan. 23, 1973. That prior art structure included a filter housing molded from a plastic material, having a pleated filter element and protective screen mounted therein. The side walls of the housing each had a hinged upper portion with a lip formed thereon to swing over the adjacent edge of the filter and screen to hold them in the housing. In that structure, the screen provided a protective covering for the filter element, but it was also used to hold the pleated filter element in the housing during assembly of the unit. In many applications, however, the added protection afforded by the screen is not needed.

SUMMARY OF THE INVENTION

The present invention provides a panel filter having a molded plastic housing carrying a pleated filter. The screen that was used to hold the filter element in place during assembly has been eliminated, thus effecting a reduction in both construction time and cost. In the present invention, the side walls each comprise an inner wall portion and an outer wall portion. The inner wall portion is hinged to the top edge of the outer wall portion so that it can be swung over the outermost end fold of the pleated filter element to hold that end of the pleated filter element against the side wall. Other features and advantages of the present invention will be set forth in the following specification.

BRIEF DESCRIPTION OF THE DRAWINGS

FIG. 1 is a view in perspective of the molded plastic housing of the present invention, prior to assembly of the air cleaner;

FIG. 2 is an end view of the assembled air cleaner, portions thereof being broken away and portions being shown in section;

FIG. 3 is an enlarged fragmentary view taken along line 3—3 of FIG. 2;

FIG. 4 is a view in perspective of a portion of the housing and pleated filter element, in partially assembled form; and FIG. 5 is a view in perspective similar to FIG. 4, showing the next step in constructing the assembly.

DESCRIPTION OF THE PREFERRED EMBODIMENT

In the drawings, FIG. 1 discloses a unitary, molded plastic housing 10 having a generally rectangular bottom wall 11 with an aperture 12 therein forming an air flow passage for the filter assembly. Attached to the opposite side edges of the bottom wall 11 are opposed side wall means generally designated by the numerals 13 and 14. Because the two side wall means 13 and 14 are identical in construction, only number 14 will be described in detail.

Side wall means 14 includes a first rectangular wall portion 15, having inner and outer faces, connected along a bottom edge thereof to the bottom wall means 11 by first hinge means 16. A second rectangular wall portion 17, having inner and outer faces and of generally the same size as wall portion 15 is connected adjacent one edge thereof to the upper or outer edge of wall portion 15 by second hinge means 18. The two hinge means 16 and 18 are simply thin portions in the molded side walls that permit them to be folded in the manner of a hinge. As shown in FIG. 1, hinge means 18 actually connects the outer edge of wall portion 15 to one wall of second wall portion 17 directly adjacent the edge thereof so that when the unit is removed from mold, wall portion 17 is perpendicular to wall portion 15 as shown in FIG. 1.

Side wall means 14 is also provided with an elongated lip member 19 which is connected to a wall of second wall portion 17 directly opposite from hinge means 18, so that lip member 19 extends perpendicular to second wall portion 17.

Mounted within the housing 10 is a substantially rectangularly-shaped, accordion-like pleated filter element 23 constructed from a gas permeable material. The pleated filter element includes a series of rectangular folds such as 23a, 23b and 23c separated by fold lines such as 24. The filter element 23 extends between the two side wall means 13 and 14 and is supported by the bottom wall 11.

Each side of the bottom wall 11 is provided with an upstanding wall member 25, 26, which is rectangular in shape, and positioned closely adjacent the first hinge means 16. When the side wall means 13 and 14 are folded to a position perpendicular to the bottom wall 11, as shown in FIG. 2, a slot is formed between each of the upstanding wall members 25, 26 and the adjacent first wall portion 15.

The air cleaner is assembled by placing the pleated filter element 23 in the housing 10, with the housing 10 in the configuration shown in FIG. 1. As shown in FIG. 4, at least the outermost end fold 23a is placed along or adjacent to the upper surface of first wall portion 15. The next fold 23b is thus positioned adjacent the outer surface of upstanding wall member 26. The fold line connecting folds 23a and 23b is positioned adjacent first hinge means 16. The next step, which is shown in FIG. 5, is to fold second wall portion 17 inwardly about hinge means 18 to place it in a side-by-side relationship with first wall portion 15. It can be seen that the opposite faces of end fold 23a are located between and in face-to-face contact with the inner faces of the wall portions 15 and 17 at this point.

Each end of each of the first wall portions 15 is provided with an upwardly extending latch member 27. Each latch member 27 extends upwardly from the upper surface of first wall portion 15 directly adjacent the end thereof. The inwardly facing surface of each latch member 27 is provided with a protruding latch at the upper end thereof so that a recessed portion is provided between the latch and the bottom end of the latch member 27. The latch members 27 are integrally molded with the housing, from a plastic material, so that they are somewhat flexible. Although wall portion 17 is generally the same size as wall portion 15, it is slightly shorter so that it can be snapped between the two opposing latch members 27 on the ends of first wall portion 15. When the second wall portion 17 is folded over to the position of FIG. 5, the latch members 27 engage the opposite ends thereof to hold the two wall portions in the generally side-by-side relationship with the end fold 23a therebetween. It should be noted that the distance between the two latch members 27 on each wall portion 15 is approximately equal to the length of the filter element 23 so that the latch members 27 act to center the filter element between them. This prevents the filter element from protruding further toward one end than the other, which would result in bended pleats when the end cover is folded into position.

The next step from the step of FIG. 5 is to fold the entire side wall means upwardly about hinge means 16 to a position perpendicular to bottom wall 11, as shown in FIG. 2. The latch members 27 are sufficiently long so that they engage the opposite ends of the adjacent upstanding wall member 25 or 26 to hold the side wall means perpendicular to the bottom wall during further steps of assembling the unit. When the side wall means 13 and 14 are moved to the final position shown in FIG. 2, the filter element 23 has a pair of folds at each end thereof positioned in the corresponding slot between the upstanding wall member 25 or 26 and the first wall portion 15, with the fold line between the two folds positioned adjacent the bottom of the slot. The second wall portion 17 extends between the pair of folds to the bottom of the slot. The sides of the pleated filter element are thus held securely against the side wall means during the remaining assembly steps. In addition, this construction results in a very efficient seal for the full length of the pleated filter along both sides of the assembly. No adhesive is required to seal the sides of the assembly.

When the side wall means are moved to the perpendicular position of FIG. 2, the lip member 19 extends a short distance over the top of the pleated filter 23. Lip member 19 aids in holding the filter element in the housing and also makes the side wall more rigid. If a protective screen were needed in a particular application, it would also act to hold the edges of the screen against the top surface of the pleated filter.

The housing is also provided with integrally molded end caps 30 and 31 that are connected to opposite end edges of the bottom wall 11 by hinge means of the type previously described. After the side wall means 13 and 14 are folded to the final position shown in FIG. 2, the two end caps 30 and 31 are folded upwardly over the two ends of the filter assembly. As best shown in FIG. 3, the end caps 30 and 31 are provided with mechanical interlock members that cooperate with enlarged end portions of the lip members 19, to initially hold the end caps locked in their final position. The inner surface of each end cap 30 and 31 is provided with a recess or depression 32 at each end thereof to accommodate the corresponding latch member 27 when the end cap is closed.

Before the end caps 30 and 31 have been snapped into the final position, the unit is turned on one end and a predetermined amount of hot melt thermoplastic material is poured into the bottom end cap to adhesively secure it to the end of the filter element 23 to thereby seal the unit from air passage between the filter element and the end cap. When the thermoplastic material hardens, the same procedure is repeated for the opposite end cap. It should be noted that each end of each first wall portion 15 is provided with a relief area or recess 20 on the outer surface thereof to permit adhesive to flow into the space thus formed between first wall portion 15 and the adjoining end caps as best shown in FIG. 2. Instead of using holt melt thermoplastic to seal the ends of the pleated filter element, an alternative approach is to place pads of sponge material between the filter ends and the end caps. The sponge material, when tightly squeezed therebetween, forms an effective seal. When sponge material is used, the end caps 30 and 31 can be snapped open and shut as needed to service or replace the filter element.

The entire housing 10 can be molded from a suitable plastic in a single operation. The filter element is then assembled into the housing in the manner heretofore described. The double side wall structure forms an effective air seal without the need for any adhesive or other sealant, and also enhances the rigidity of the structure. The present invention thus provides an inexpensive, easily assembled structure suitable for use as a disposable or easily servicable air cleaner for samll internal combustion engines. The novel features of the present invention are set forth in the following claims.

We claim:

1. A filter assembly in which a pleated filter element is supported in a housing without the need of a screen to support the filter element, comprising:
   a. a housing having two opposed side wall means and bottom wall means joining said side wall means, said bottom wall means having an aperture therein;
   b. said side wall means each comprising a first wall portion, having inner and outer faces, connected along a bottom edge thereof to said bottom wall means by first hinge means, and a second wall portion, having inner and outer faces, connected adjacent one edge thereof to an upper edge of said first wall portion by second hinge means;
   c. a pleated filter element comprising a series of folds connected by fold lines, extending between said side wall means;
   d. means for holding both wall portions of each of said side wall means in a side-by-side relationship generally perpendicular to said bottom wall means with said second wall portions positioned between said first wall portions;
   e. said filter element having at least one fold at each end thereof engaged between said first and second wall portions of the adjoining side wall means, each said one fold having opposite faces thereof in face-to-face contact with the inner faces of said corresponding side wall means; and
   f. means for sealing the ends of said pleated filter element.

2. The filter assembly of claim 1 wherein an upstanding wall member is mounted on said bottom wall means adjacent each of said side wall means to form a slot between said upstanding wall member and said first wall portion into which said one fold, an adjacent fold, and the connecting fold line extends, with said second wall portion extending between said folds to securely hold said folds in said slot.

3. The filter assembly of claim 2 wherein a pair of inwardly extending latch members are affixed to opposite ends of said first wall portion to engage opposite ends of said second wall portion to hold said portions in a generally side-by-side relationship, said latch members also acting to center said one fold therebetween.

4. The filter assembly of claim 3 wherein said latch members are sufficiently long to engage opposite ends of said upstanding wall member to hold said side wall means perpendicular to said bottom wall means.

5. A disposable air filter assembly in which a pleated filter element is supported in a housing without the need of a screen to support the filter element, comprising:
   a. a unitary, molded housing having two opposed side wall means and bottom wall means joining said side wall means, said bottom wall means having an air flow passage therein;
   b. said side wall means each comprising a first rectangular wall portion, having inner and outer faces, connected along a bottom edge thereof to said bottom wall means by first hinge means, and a second rectangular wall portion of generally the same size, and having inner and outer faces, connected adjacent one edge thereof to an upper edge of said first wall portion by second hinge means;
   c. an accordion-like pleated filter element comprising a series of folds connected by fold lines, extending between said side wall means;
   d. means for holding both wall portions of each of said side wall means in a side-by-side relationship generally perpendicular to said bottom wall means with said second wall portions positioned between said first wall portions;
   e. said housing including a rectangular wall member extending upwardly from said bottom wall means adjacent each of said side wall means to form a slot between each wall member and the adjacent first wall portion;
   f. said filter element having a pair of folds at each end thereof positioned in one of said slots with the fold line between each pair positioned adjacent the bottom of the slot, said second wall portion extending between said pair of folds, and the end folding extending between said first and second wall portions with opposite faces thereof in face-to-face contact with the inner faces of said wall portions; and
   g. means for sealing the ends of said pleated filter element.

* * * * *

Disclaimer

3,778,985.—*Paul A. Daigle*, Castle Rock, and *Donald D. Gronholz*, Bloomington, Minn. AIR CLEANER WITH FOLDING SIDE WALLS. Patent dated Dec. 18, 1973. Disclaimer filed Apr. 16, 1979, by the assignee, *Donaldson Company, Inc.*

Hereby enters this disclaimer to claim 1 of said patent.

[*Official Gazette June 19, 1979.*]